United States Patent
O'Dell

(10) Patent No.: US 8,370,209 B2
(45) Date of Patent: Feb. 5, 2013

(54) METHOD FOR AGGREGATED LOCATION-BASED SERVICES

(75) Inventor: Michael O'Dell, Leesburg, VA (US)

(73) Assignee: UVerj, LLC, Leesburg, VA (US)

( * ) Notice: Subject to any disclaimer, the term of this patent is extended or adjusted under 35 U.S.C. 154(b) by 142 days.

(21) Appl. No.: 12/842,531

(22) Filed: Jul. 23, 2010

(65) Prior Publication Data

US 2011/0040642 A1 Feb. 17, 2011

Related U.S. Application Data

(60) Provisional application No. 61/232,970, filed on Aug. 11, 2009.

(51) Int. Cl.
*G06Q 30/00* (2012.01)
(52) U.S. Cl. .................................................. 705/26.1
(58) Field of Classification Search .............. 705/26–27
See application file for complete search history.

(56) References Cited

U.S. PATENT DOCUMENTS

| | | | | |
|---|---|---|---|---|
| 5,158,155 A * | 10/1992 | Domain et al. | ................. | 186/53 |
| 5,999,914 A * | 12/1999 | Blinn et al. | ..................... | 705/26 |
| 2004/0143502 A1 * | 7/2004 | McClung, III | .................. | 705/14 |
| 2004/0249643 A1 * | 12/2004 | Ouyang et al. | ..................... | 705/1 |
| 2006/0259421 A1 * | 11/2006 | Maass | .............................. | 705/39 |
| 2007/0130090 A1 * | 6/2007 | Staib et al. | ..................... | 705/400 |
| 2007/0150369 A1 * | 6/2007 | Zivin | .............................. | 705/26 |
| 2007/0265914 A1 * | 11/2007 | McClung | ........................ | 705/14 |
| 2008/0091539 A1 * | 4/2008 | Ruckart | ......................... | 705/14 |
| 2008/0215552 A1 * | 9/2008 | Safoutin | ......................... | 707/3 |
| 2008/0301006 A1 * | 12/2008 | Holly et al. | ..................... | 705/27 |
| 2008/0319849 A1 * | 12/2008 | Rapoport | ........................ | 705/14 |
| 2009/0012881 A1 * | 1/2009 | Popelka et al. | ................. | 705/27 |
| 2009/0164383 A1 * | 6/2009 | Rothman | ........................ | 705/80 |
| 2009/0199124 A1 * | 8/2009 | Birch | ............................ | 715/772 |
| 2010/0042488 A1 * | 2/2010 | McClung, III | ............. | 705/14.13 |
| 2010/0125492 A1 * | 5/2010 | Lin et al. | ...................... | 705/14.5 |
| 2010/0125497 A1 * | 5/2010 | Arguello | ................... | 705/14.33 |

OTHER PUBLICATIONS

Austen, I, "Samsung Puts a Colorful Twist on its Handheld-Phone Hybrid" (New York Times, Apr. 19, 2001 p. G3.*

* cited by examiner

*Primary Examiner* — Jeffrey A Smith
*Assistant Examiner* — Ethan D Civan
(74) *Attorney, Agent, or Firm* — DLA Piper LLP (US)

(57) ABSTRACT

A method for operating an aggregated web service to display location-based items and services and allow for their remote purchase and pick-up or delivery. Algorithms provided to vendors allow for automated pricing adjustments to encourage purchase in competitive geographical locations.

32 Claims, 14 Drawing Sheets

Mail Menu Buttons

1300

| | Button | Open Level | | |
|---|---|---|---|---|
| Mail — 1301 | | | | |
| 1302 — | All | Button | Search | |
| 1303 — | Drop-off | Button | Open Level | |
| | 1304 — All | Button | Drop-Down | Search |
| | 1305 — Business | Button | Open Level | Search |
| 1306 — | Services | | | |
| | 1307 — All | Button | Drop-Down | Search |
| | 1308 — Business | Button | Open Level | Search |
| 1309 — | Supplies | | | |
| | 1310 — All | Button | Drop-Down | Search |
| | 1311 — Business | Button | Drop-Down | Search |

Business Drop-Down buttons display list of businesses/establishments within the scope of the filtered distance & selector buttons. When the "Business" button under Drop-off is selected, then only drop-offs are shown for the selected business.

FIG. 6d

COUNT-DOWN CLOCK OPTIONS

Bank, Buy, Eat, and Mail Counter Options

1401
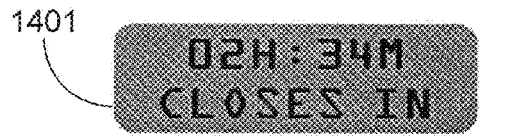
Green clock when store is open and there is more than 60 minutes until closing.
Time displayed until closing.

1402
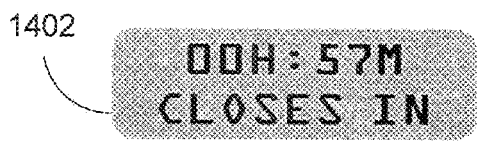
Amber clock when store is open and there is 60 minutes or less until closing.
Time displayed until closing.

1403
Red clock when store is closed.
Time displayed until opening.

Mail Counter Options

1404
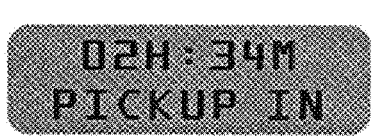
Green clock when mail pickup has not occurred same day and there is more than 60 minutes until pickup.
Time displayed until pickup.

1405
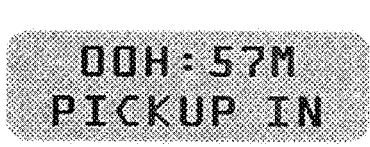
Amber clock when mail pickup has not occurred same day and there is 60 minutes or less until pickup.
Time displayed until pickup.

1406
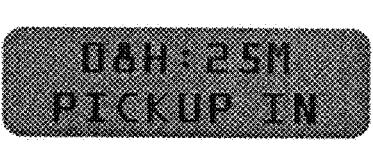
Red clock when mail pickup has occurred same day.
Time displayed until next pickup on next day.

METHOD FOR AGGREGATED LOCATION-BASED SERVICES

This application is based on and derives the benefit of the filing date of U.S. Provisional Patent Application No. 61/232,970, filed Aug. 11, 2009. The content of this application is herein incorporated by reference in its entirety.

TECHNICAL FIELD

The present disclosure generally relates to methods for operating an aggregated web services network to deliver location-based results to mobile and/or desktop web browsers. The present disclosure further relates to methods for operating data collection servers, database storage servers, web site delivery services, and/or vendor pricing algorithm services for use in such aggregated web services network.

BRIEF DESCRIPTION OF THE DRAWINGS

FIG. 6d is a diagram that illustrates various selectable buttons associated with a mail search service, according to an embodiment; and FIG. 7 is a diagram that illustrates multiple variations of a count-down clock that can be displayed in association with one or more of the location-based services, according to an embodiment.

DETAILED DESCRIPTION OF SEVERAL EMBODIMENTS

Figure 1A:
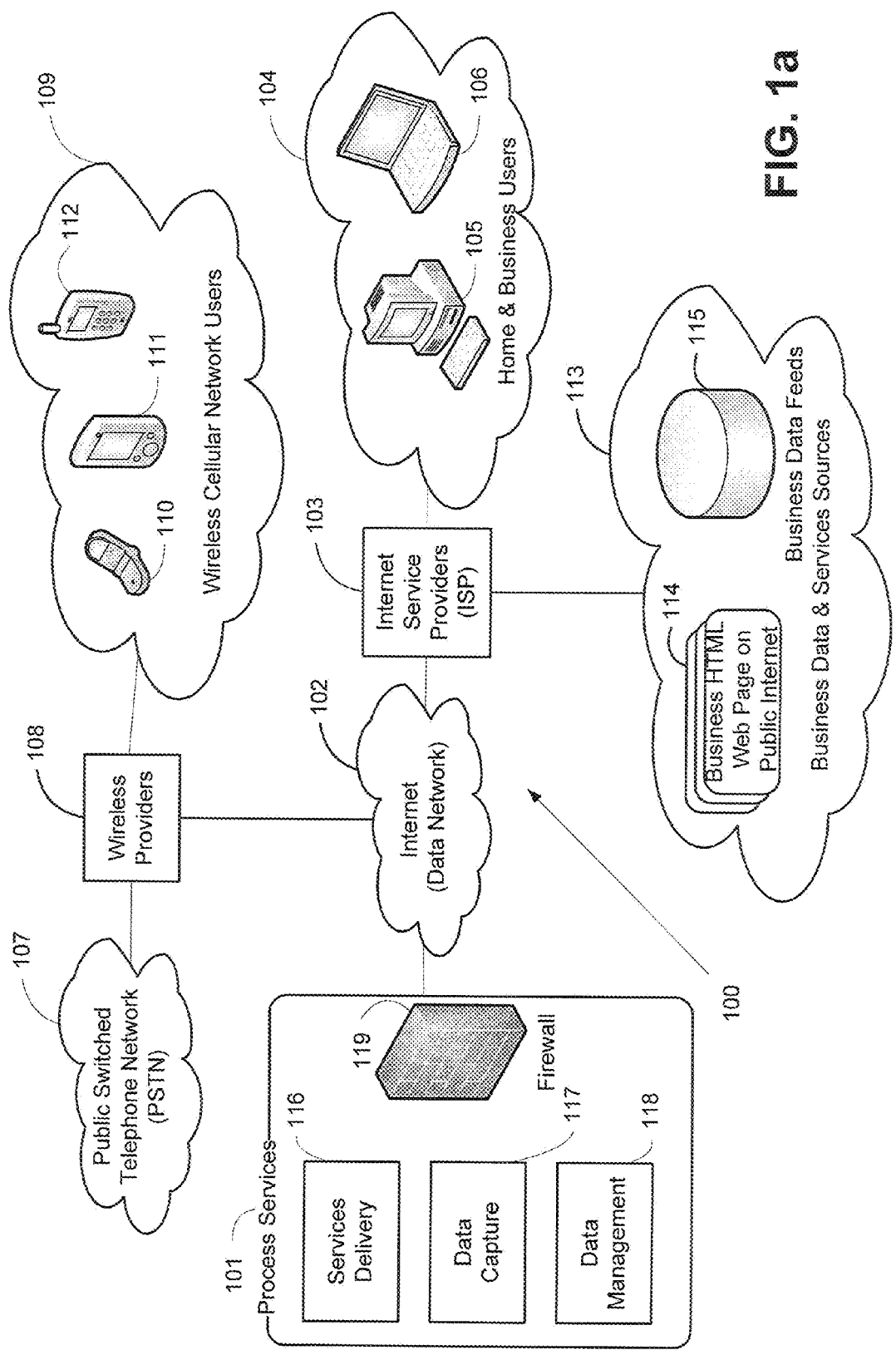
FIG. 1a is a diagram that illustrates a network architecture having process services and networks that connect various parties, according to an embodiment.

FIG. 1a illustrates an embodiment of a process architecture 100 for use in aggregated location-based services. The process architecture 100 can include process services 101 having a services delivery 116, a data capture 117, and a data management 118, all of which can pass through a firewall 119. The process services 101 can communicate through a data network, such as a public internet 102, for example, with networks associated with both wireless providers 108 and Internet service providers (ISPs) 103. Users of the services provided in the process architecture 100 can include mobile users 109 and home and business users 104. Mobile users 109 can use browsers commonly found in the type of handheld devices that are used in connection with the internet services provided by wireless providers 108. These handheld devices can include flip phones 110, touch screen and personal digital assistant (PDA) phones 111, and traditional cell phones 112, for example. Mobile users can also connect to traditional landline phones through a public switched telephone network (PSTN) 107 accessed via their wireless providers 108. Devices associated with home and office desktop users 104 can include desktops 105 and laptops 106, or other devices capable of browsing web sites, for example. These devices can use browsers commonly found in these devices to connect to the other networks via services provided by their ISPs 103. Data associated with aggregated location-based services can be retrieved from business data and services sources 113, which may include both public and private sources. For example, publicly available business web pages 114 can be searched to populate and update the data stored in the process services 101 while business data feeds 115 provided by private participating businesses can have access (e.g., by authentication) to the data stored associated with such businesses to update and manage their inventories, pricings, and/or pricing algorithms. Further, business data and services sources 113 can include third-party services providers such as location, address, verification, directions, and map transmission 315 (see FIG. 1c) and merchant services approval and processing 316 (see FIG. 1c).

Figure 1B:
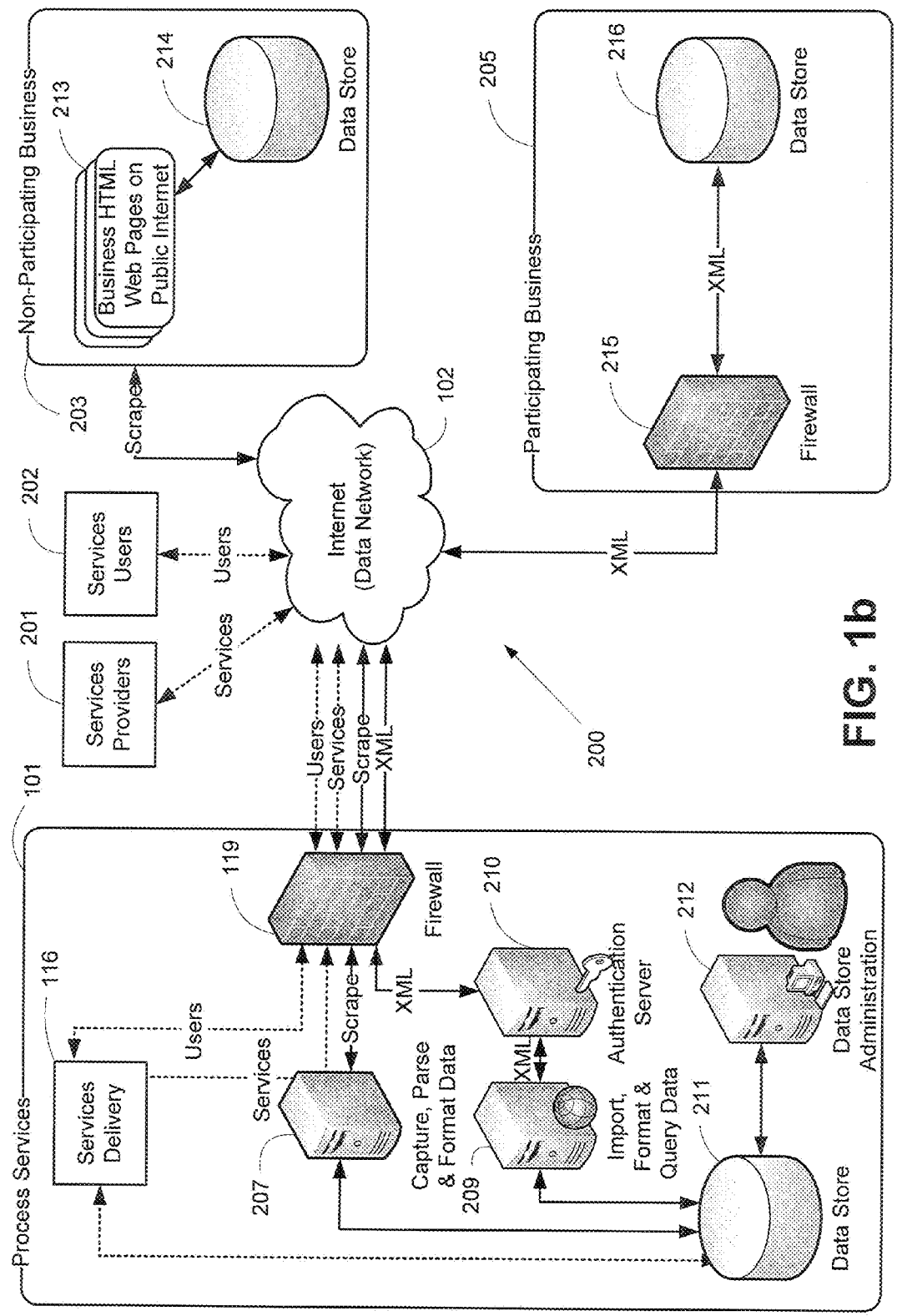
FIG. 1b is a diagram that illustrates data capture components, such as a scraper, and networks that can be transited to access data providers, according to an embodiment.

FIG. 1b illustrates an embodiment of a data capture architecture 200 having process services 101 that use a data network, such as the internet 102, for example, to retrieve public data from non-participating businesses 203, linked data from participating businesses 205, and provide services to services users 202 and receive services from third-party services providers 201. The third-party services providers 201 can be a subset of the business data and services sources 113 shown in FIG. 1a. Services users 202 can include the wireless cellular network users 109 and the home and business users 104 described above with respect to FIG. 1a. Non-participating businesses 203 can refer to those businesses that have data stored in data store 214 and publicly present that data in a public web site 213 associated with the business. The non-participating businesses 203 can be a subset of the business data and services sources 113 described above with respect to FIG. 1a. The capture, parse, and format data server 207, which can also be referred to as a scraping server 207, can run an automated computer program or application that communicates with the business HTML web pages on public internet 213 web sites through a firewall 119. These scraped communications can request and retrieve select content from the web pages associated with the business HTML web pages on public internet 213 web sites from the non-participating businesses 203. The scraping server 207 can capture, parse, and/or format the data that is retrieved for comparison to the records in a data store 211 in the process services 101. Web site scraping is an active field in which new developments continue to occur. Currently, several vendors offer scraping product solutions. This disclosure, however, need not be limited to current off-the-shelf offerings but may rely on custom offerings and/or future offerings of scraping product solutions.

Based on records returned by the scraping server 207, the data store 211 will be updated to reflect new record additions, changes to existing records, and deletion of out-of-date records. Business HTML web pages on public internet 213 web sites of the non-participating business 203 can be regularly scraped (e.g., scheduled scrapes) for updates, changes and/or deletions. Examples of the type of data elements that can be requested and/or retrieved from the public business HTML web pages on public Internet 213 web sites can include store location addresses, location name and/or type, phone numbers, hours of operation, mail or package pick-up times, item or service prices, inventory quantities, and product names and product numbers.

Participating businesses 205 can refer to those businesses that contract or have a relationship with the process services 101 and can update records related to those businesses in the data store 211 via real-time extensible markup language (XML) or other automated and authenticated method. The process of updating records in the data store 211 can be initiated either by the process services 101 or by a participating business 205. When the participating business 205 initiates the update, then an automated system (not shown) operated by the participating business 205 may establish communication between the participating business 205 and the authentication server 210 in the process services 101 via XML or other automated and authenticated method. Such communication can pass through, for example, a firewall 215 in the participating business 205, the internet 102, and a firewall 119 in the process services 101. The authentication server 210 can be configured to authenticate and to approve the identity of the electronic connection through the use of any common encrypted authentication and access process. When the secure electronic connection is authenticated and approved, the authentication server 210 can pass the electronic connection to the import, format and query data server 209. The import, format and query data server 209 can then compare the data records in the data store 216 of the participating business 205 with the contents in the data store 211 of the process services 101 to determine whether data updates are needed. When the import, format and query data server 209 initiates an automated electronic records update, the process services 101 can authenticate with the data store 216 to establish an approved connection and to commence comparing records between the data store 211 and the data store 216 before updating records on the data store 211.

Participating businesses 205 can conform to standardized electronic templates that indicate the data elements under consideration for updates. When a participating business 205 participates in an e-commerce service, as described in more detail below with respect to FIG. 1c, the participating business 205 can provide additional data elements not included in the standardized electronic templates, such as product names and prices, for example. The automation provided with a participating business 205 can result in a reduction in the processing power of this approach when compared to a scraping approach used with non-participating businesses 203 when determining timely data changes across the entire data set versus an electronic exchange that can update real-time incremental changes on a per business basis.

A services delivery 116 of the process services 101 can communicate through the firewall 119 and the internet 102 to third-party services providers 201 and services users 202 and is further described in more detail below with respect to FIG. 1c. The administration or management of the data store 211 can be performed by a data store administration 212 server that can be configured to confirm that records in the data store 211 are intact and/or are correctly updated. Examples of the functions of the data store administrator 212 can include verifying each business scraping program is returning valid data and that a business has not changed their web site which would require its related scraper to be updated. The data store administrator 212 can also verify that duplicate records are not being generated in the data store through the use of monitoring scripts and user initiated searches, and to manage the schedule of the scraping routines to balance time sensitive updates against bandwidth and processing limitations, for example.

Figure 1C:
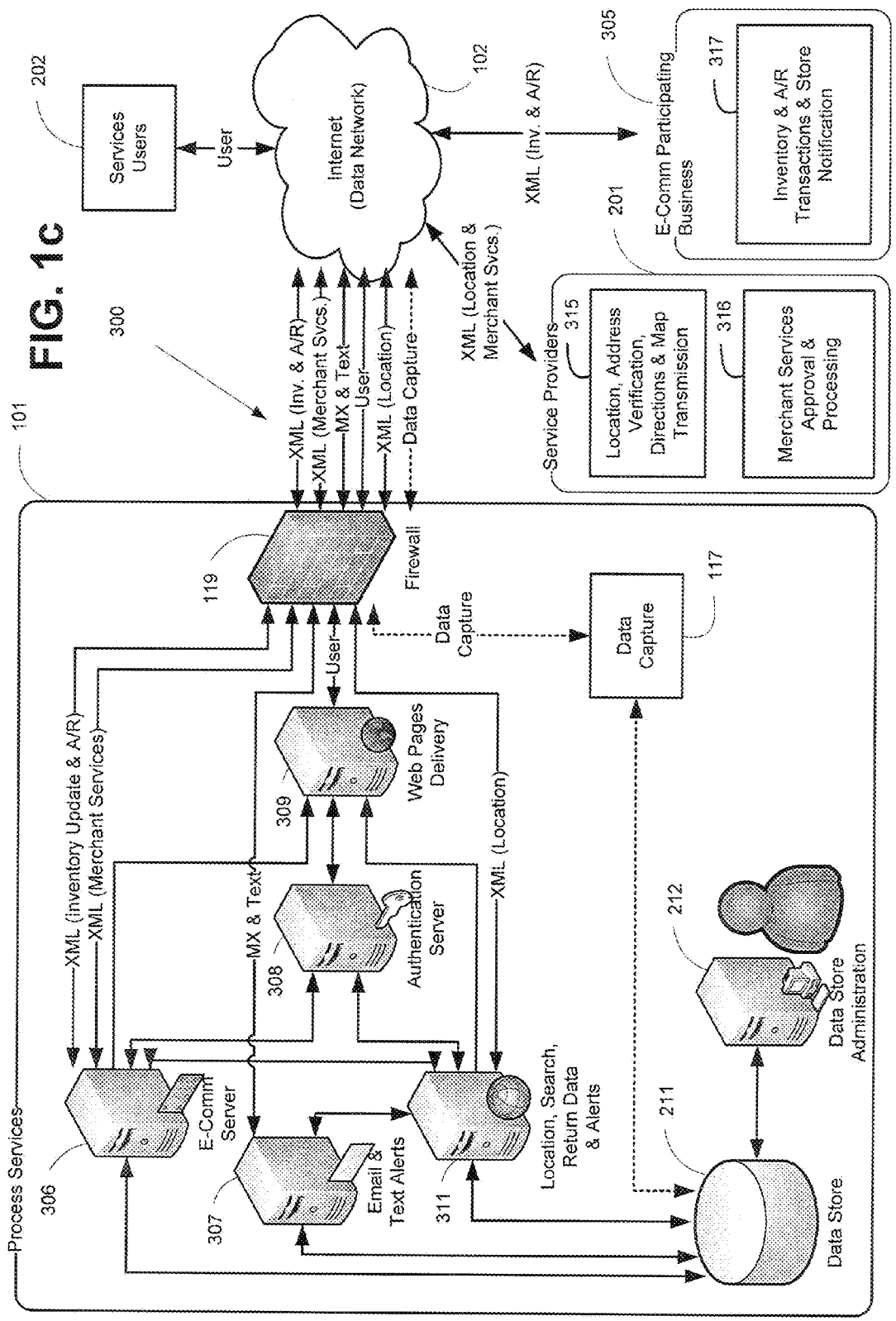
FIG. 1c is a diagram that illustrates services delivery components, such as a web site, and networks that can be transited to provide access to users, e-commerce participating businesses, and third-party service providers, according to an embodiment.

FIG. 1c illustrates an embodiment of a services delivery architecture 300 having process services 101 that can communicate with services users 202, third-party services providers 201, and e-commerce participating businesses 305 through a firewall 119 and a data network such as the internet 102, for example. The web pages delivery server 309 can interact with the browsers supported by the devices used by the services users 202. Such browsers can be used to, for example, render pages and search results. The services users 202 can perform aggregated location-based searches associated with products and services, for example, by using a graphical interface displayed in a browser having a button search methodology configured for such type of products and services. Those search requests can be passed to the location, search, return data and alerts 311 server in the process services 101 to query the data store 211 and return the requested data elements to the web pages delivery 309 server to render the appropriate information in the browser of a services user 202. The search query can require location and range settings prior to initiating any searches through the browser. Users that are presented with and desiring e-commerce purchase options can log in to a secure service (e.g., secure socket layer (SSL)) that can be authenticated through an authentication server 308 for connecting the services users 202 to the e-commerce server 306 of the process services 101.

E-commerce participating businesses 305 can be a subset of the participating businesses 205 shown in FIG. 1b with, for example, enhanced connectivity. These businesses can provide real-time information for inventory and accounts receivable transactions and store notification 317 in addition to electronic confirmation of availability, which can be required for an e-commerce transaction. When the e-commerce participating business 305 also participates in a real-time pricing algorithm associated with aggregated location-based services, then the data elements of a standard template may also include lowest price limit, criteria trigger values for reduced sales pricing, and discount method, for example, as described below with respect to FIG. 4. Such sales price triggering, when invoked, can be displayed to the user during the initial query search results. Once the e-commerce transaction is completed and verified via the browser of the services user 202, depending on the option or options chosen, the user can either proceed to the store to pick up the purchased item or can wait for the item to be delivered by mail.

Merchant services approval and processing 316 providers of third-party services providers 201 can contract or establish a relationship with the process services 101 for e-commerce sales processing. While e-commerce transactions can be typically related to purchases using a "Buy" button in a graphical interface provided to the user's browser, additional third-party services providers 201 can provide third-party location, address, verification, directions and map transmission 315 which can be used to validate all "Buy" button e-commerce address requirements and all non-ecommerce location searched addresses for all of the search buttons. Other services, such as maps and drive-to directions can also be provided and displayed on the user's browser. Services users 202 that log on can register to create email and text alerts for items such as sales confirmations, password changes, price or item watch triggers, and also sales notices, for example, which can be managed and sent by an email and text alerts server 307. The administration of the data store 211 can be performed by the data store administration server 212, which can be configured to confirm that records in the data store 211 are intact and/or updated correctly.

Figure 1D:
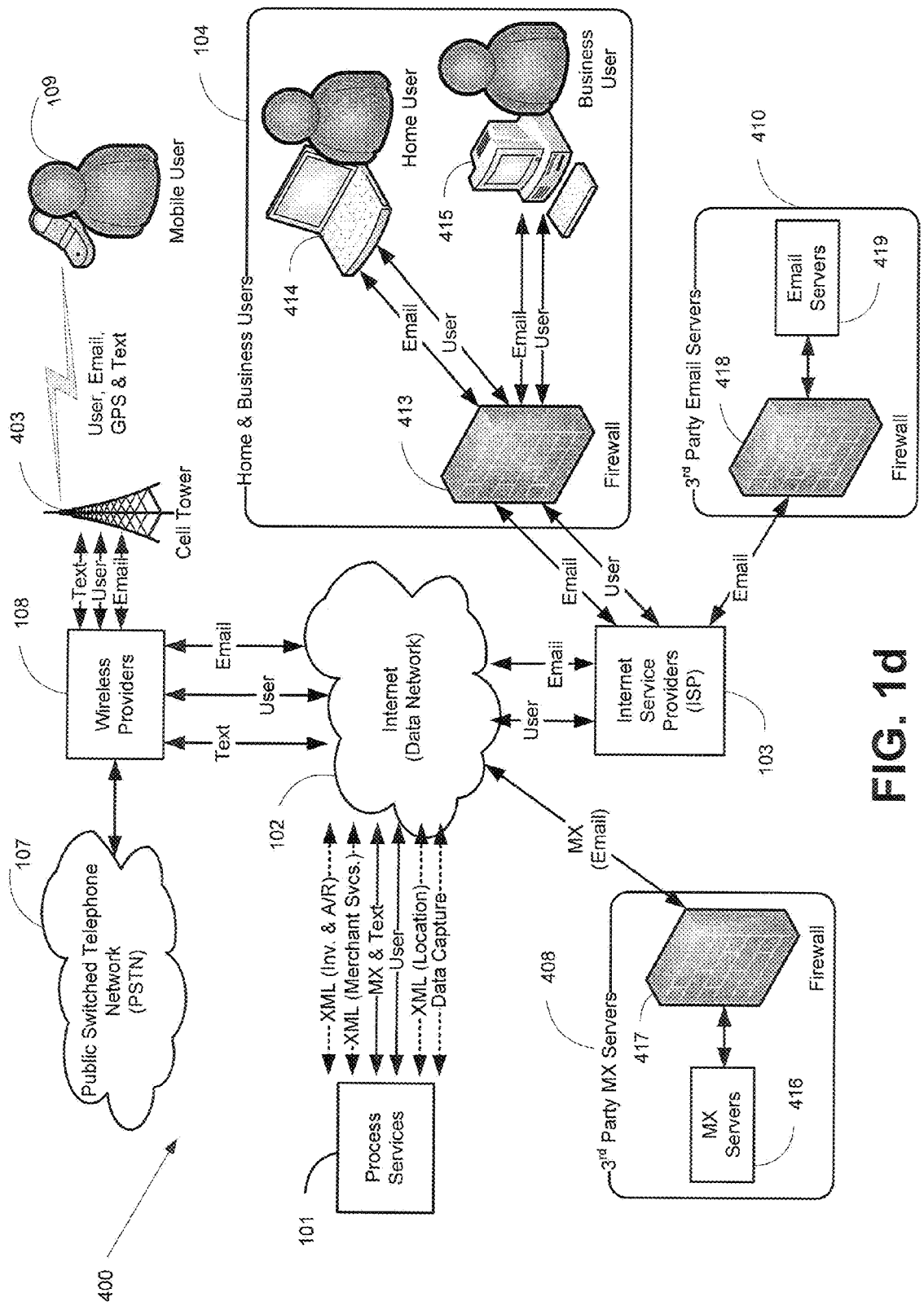
FIG. 1d is a diagram that illustrates various users of services and the networks that can be transited to access the process services, according to an embodiment.

FIG. 1d illustrates an embodiment of a services users architecture 400 in which various users can communicate with the process services 101 via the internet 102, for example. Mobile users 109 can access the process services 101 through their mobile browsers via the internet services provided by their wireless providers 108. The wireless providers 108 can communicate with the mobile users 109 via cell towers 403 or satellites. The handheld devices used by the mobile users 109 can be configured to receive email, text and/or global position system (GPS) services. Such handheld devices can be configured to receive services from the process services 101, particularly, services associated with, for example, email and text alerts and services that use personal GPS tracking for location determination and navigation. The mobile users 109 can connect to traditional landline phones through a public switched telephone network (PSTN) 107 via their wireless providers 108.

Home and business users 104 can access, through their browsers, one or more web sites supported by the process services 101 and associated with aggregated location-based services. The home and business users 104 can access such web sites by, for example, communicating through a firewall 413 and their internet service providers (ISP) 103. Home users 414 or business users 415 can use either a desktop or laptop computer, or other web site browsing device, for example, to browse the web sites supported by the process services 101 while also receiving email alerts when the desktop or laptop computer, or other web site browsing device, is properly configured.

Email alerts can be available to those who have configured their computers to receive such service from either a company-owned email server or from publicly hosted third-party email servers 410. Both company-owned email servers and third-party email servers 410 can pass traffic through a firewall 418 prior to communication with the email servers 419. The location of the email servers (e.g., internet protocol (IP) addresses) can be registered with third-party mail exchange (MX) servers 408. Email alerts sent by the process services 101 can initially communicate through the internet 102 and through a firewall 417 of the third-party MX servers 408 to the MX servers 416. The MX servers 416 can then return to the process services 101 the actual IP address of the email server to receive the alert email. The process services 101 email can be sent through the firewall 119 (see FIG. 1c) and the internet 102 to the destination email server, such as an email server in the third-party email servers 410. When email alerts are provided and enabled for operation, a mobile user 109 or a home and business user 104 can receive the email alert. Email and text alerts can be provide a user with updates or changes within a defined area of prices, hours of operation or pick-up, new opening or closing locations, new products or services, user passwords, user preferences, and count-down time alerts, for example.

Figure 2A:
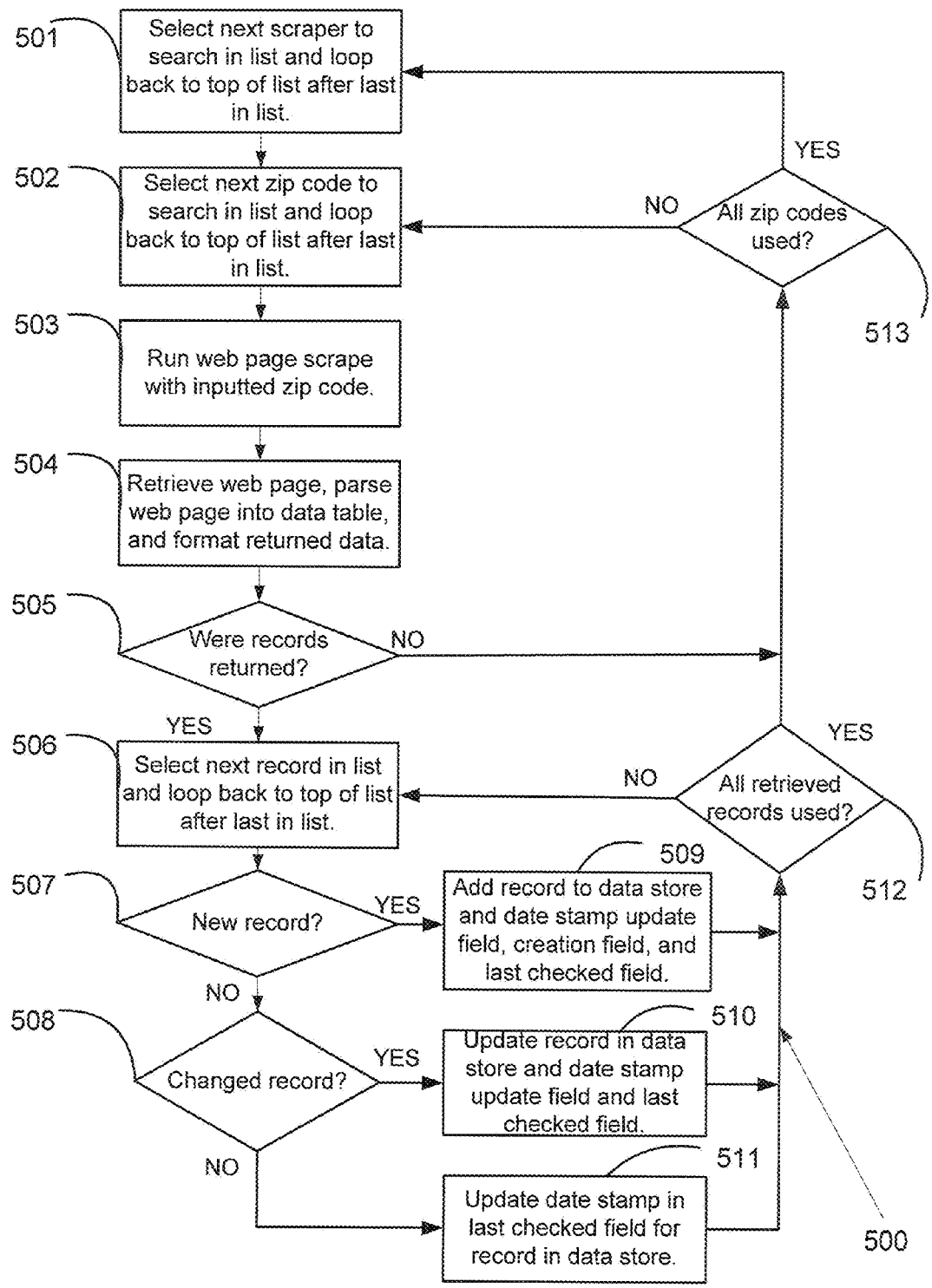
FIG. 2a is a flow diagram that illustrates a capture, parse, and format data server process for location data, according to an embodiment.

FIG. 2a shows a flow 500 associated with an embodiment of a process used in a capture, parse, and format data server for location data. In this embodiment, the capture, parse, and format data server corresponds to the capture, parse, and format data server 207 (see FIG. 1b) described above that scrapes the business HTML web pages on public internet 213 of selected non-participating business 203 (see FIG. 1b). In the flow 500, select non-participating business 203 (see FIG. 1b) web sites can be chosen for retrieving location data specific to that company's operating business or drop-off boxes from the business HTML web pages on public internet 213 (see FIG. 1b). Data elements to be retrieved can include, for example, business or drop-off boxes location addresses, location name and/or type, phone numbers, hours of operation, mail or package pick-up times, items or services available and/or pricing information. Customized and tailored to each specific non-participating company's business HTML web pages on public internet 213 (see FIG. 1b), the scrapers can be initially operated in series, one after the other, to preserve computing power and bandwidth on such a data set, which is typically not very dynamic, and can subsequently be operated in parallel. At 501, as each location scraper is called up, the selected scraper can loop through a group or list of zip codes at 502, or other country specific high-level addressing systems, until they have performed a complete loop of the zip codes at 513. The location scraper can then loop to the next tailored scraper at 501 that can target a different business HTML web pages on public internet 213 until all location scrapers have been used, at which point the system can loop back to the first location scraper and repeat the cycle.

At 503, as each zip code is transmitted to a search function of a business HTML web pages on public internet 213 (see FIG. 1b), returned web pages at 504 can be parsed into their raw data elements and formatted into a standard template by the capture, parse and format data server 207 (see FIG. 1b) and checked for records returned at 505. When no records are returned at 505, then the process checks whether all zip codes have been used for the business HTML web pages on public internet 213 of a current non-participating business's 203 (see FIG. 1b) at 513. When all zip codes have been used for scraping as determined at 513, then the process selects the next non-participating business 203 to scrape at 501, otherwise the process can increment to the next zip code in the list at 502 and perform another query for that non-participating business 203 at 503.

When records are returned at 505, the first record can be selected at 506 and checked to determine whether the record is a new record (e.g., a new location) at 507. When the record is a new record as determined at 507, the record can be added to the data store 211 (see FIG. 1b) and date stamp update field, creation field, and last checked field at 509. The process can check whether all retrieved records at 506 have been used for scraping at 512. When all retrieved records have been used, then the process can return to 513 to check whether all zip codes have been used for scraping, or when not all retrieved records have been used, then to pass the next returned record for analysis at 506.

When the record passed to 507 is not a new record, then the record can be checked to compare all data elements for any changes at 508. When the record has changed since the last update, then the changed record fields can be updated in the data store 211 (see FIG. 1b) and date stamps can be updated for the update field and last checked field at 510. After 510, the process can go back to check whether all retrieved records have been processed at 512. When the returned record is unchanged since the last update at 508, then the process can update the records date stamp for the last checked field in the data store 211 at 511 and then the process can check whether all retrieved records have been analyzed at 512. Although not shown in FIG. 2a, a separate process can be included in which record sets that have "last checked" fields that extend beyond an established amount of time can be reviewed for deletion from the data store 211 by the data store administration 212 (see FIG. 1*b*). The scraper process can be managed by an administrator, such as the data store administrator 212, for example, that can establish run times and/or monitor cycle times.

Figure 2B:
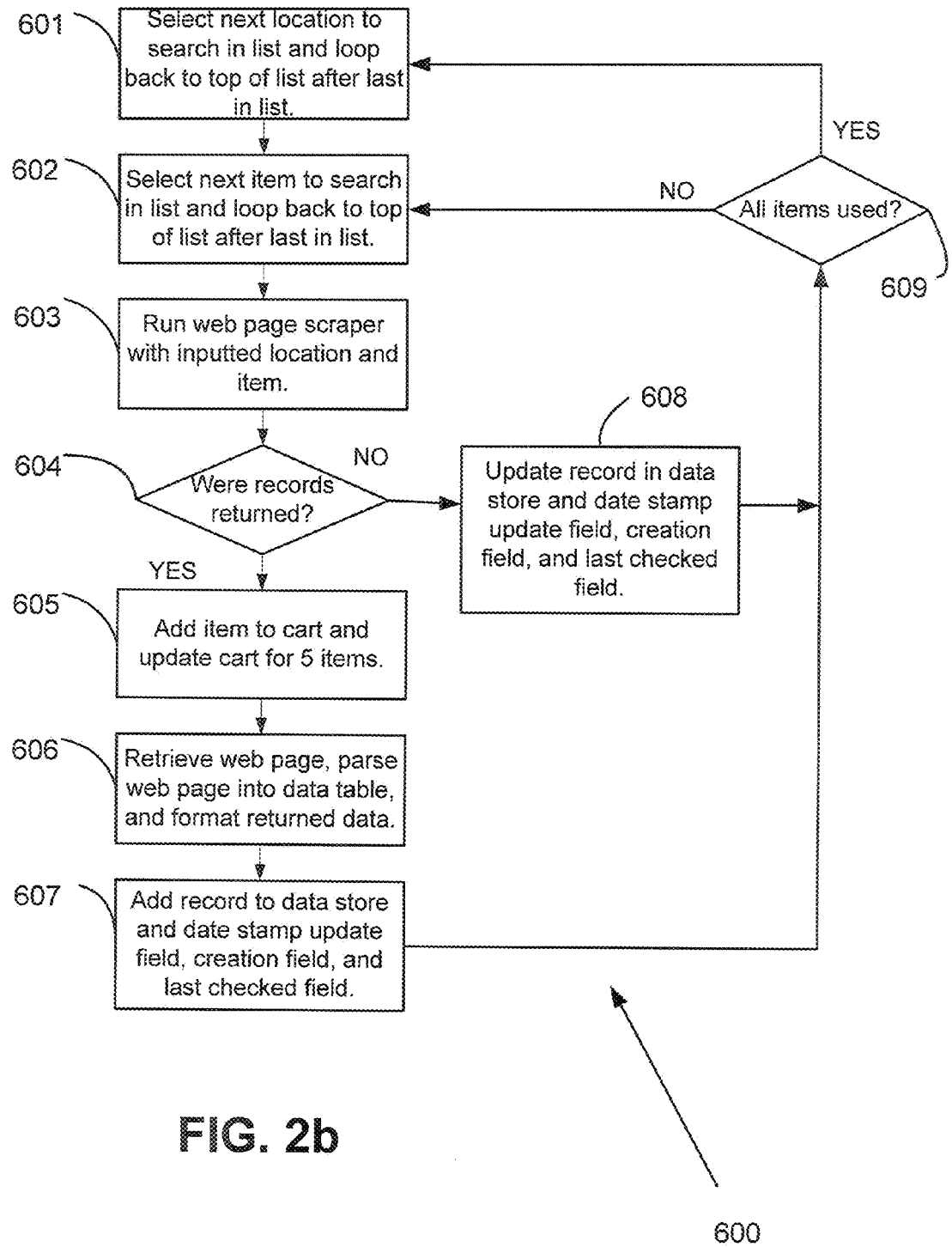
FIG. 2b is a flow diagram that illustrates a capture, parse, and format data server process for inventory data, according to an embodiment.

FIG. 2*b* shows a flow 600 associated with an embodiment of a process used in a capture, parse and format data server for inventory data. In this embodiment, the capture, parse and format data server can correspond to the capture, parse, and format data server 207 described above with respect to FIG. 1*b*. The first business location in the list at 601 can be loaded with the first item in the list at 602 to run a web page query (e.g., a scrape) of a business HTML web pages on public internet 213 of a select non-participating business 203 by location and item at 603. When no records are returned at 604, then the item record for this location can be updated in the data store 211 along with date stamping the update field, creation field, and last checked field at 608. After 608, the process can check that all items from the list have been searched at 609. When all items have been searched, then the process can select the next location at 601; otherwise, the process can select the next item to search for the same location at 602. When a record is returned for the item at 604, then the item can be added to the web site check-out cart and have the capture, parse and format data server 207 server update the quantity field for a selected number of items at 605. In one embodiment, five (5) items can be updated at 605. In other embodiments, fewer or more than five (5) items can be updated at 605. The retrieved web page can then be parsed into a data table and formatted with the returned quantity available up to, for example, five units at 606 and then the data store 211 can be updated to reflect quantity along with date stamping the update field and last checked field at 607. After 607, the process can return to check whether all items were searched for at this particular location at 609.

Figure 3:
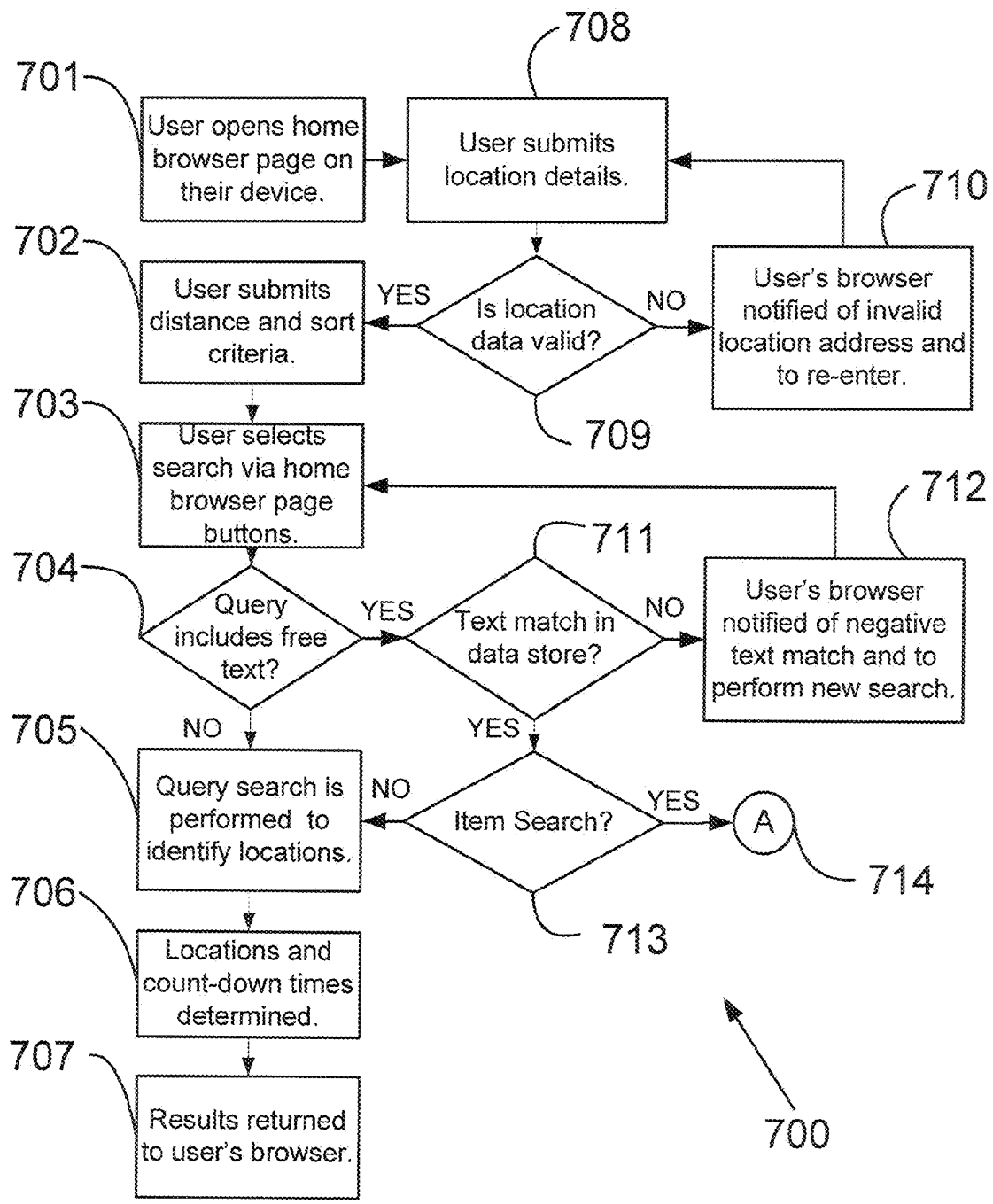
FIG. 3 is a flow diagram that illustrates an item and services search and data return process, according to an embodiment.
Figure 5:
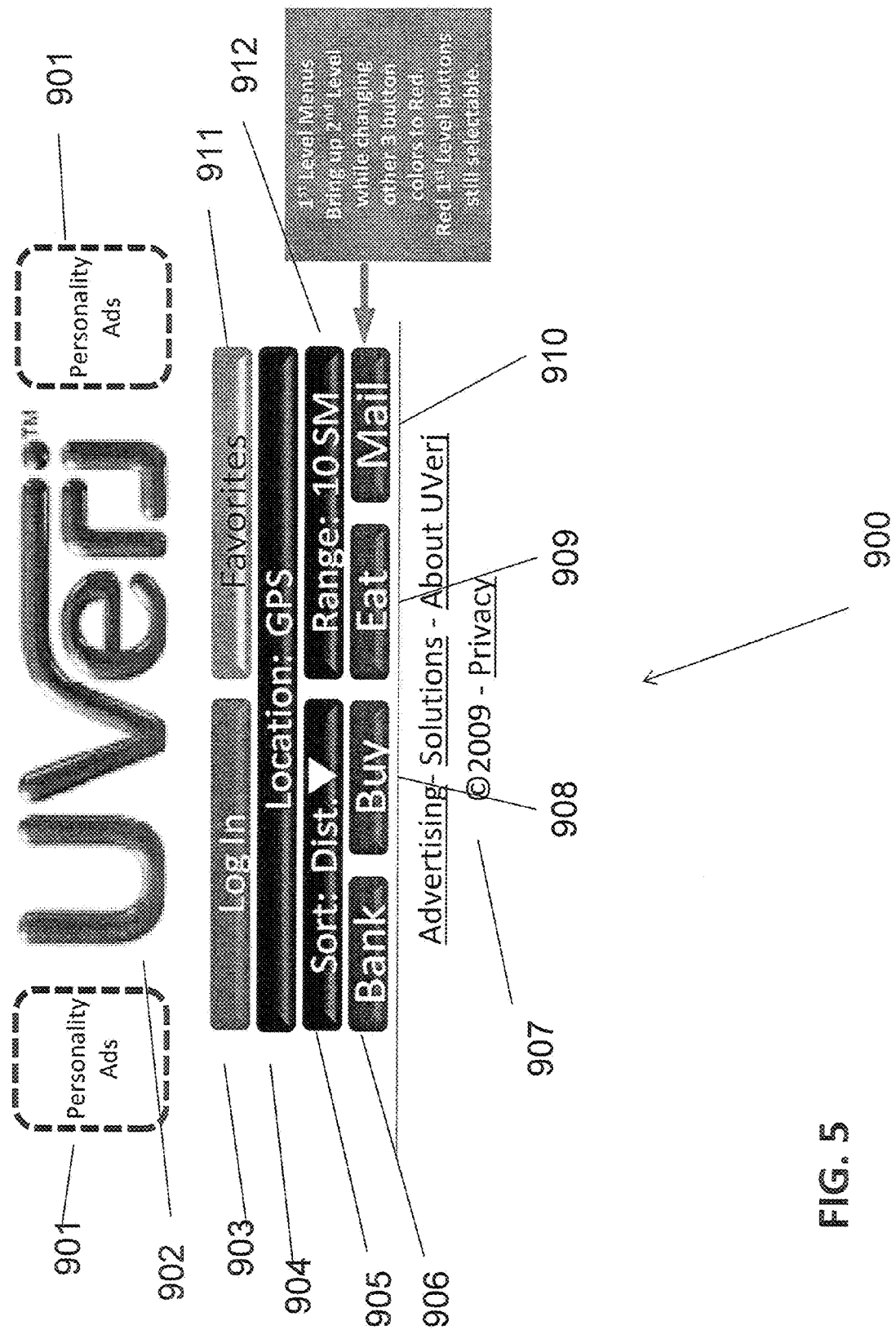
FIG. 5 is a home web screen layout for providing aggregated location-based services that shows the main first level search buttons, according to an embodiment.
Figure 6A:
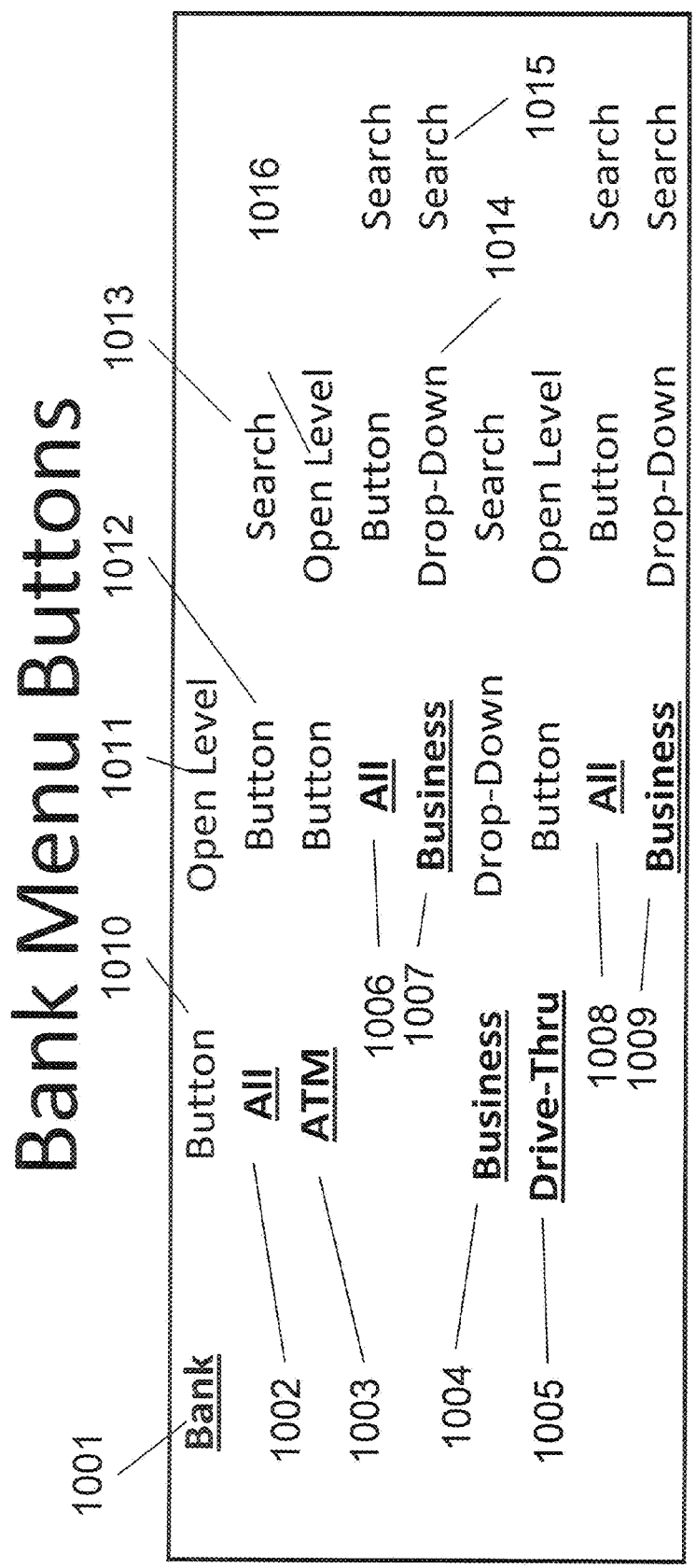
FIG. 6a is a diagram that illustrates various selectable buttons associated with a bank search service, according to an embodiment.
Figure 6B:
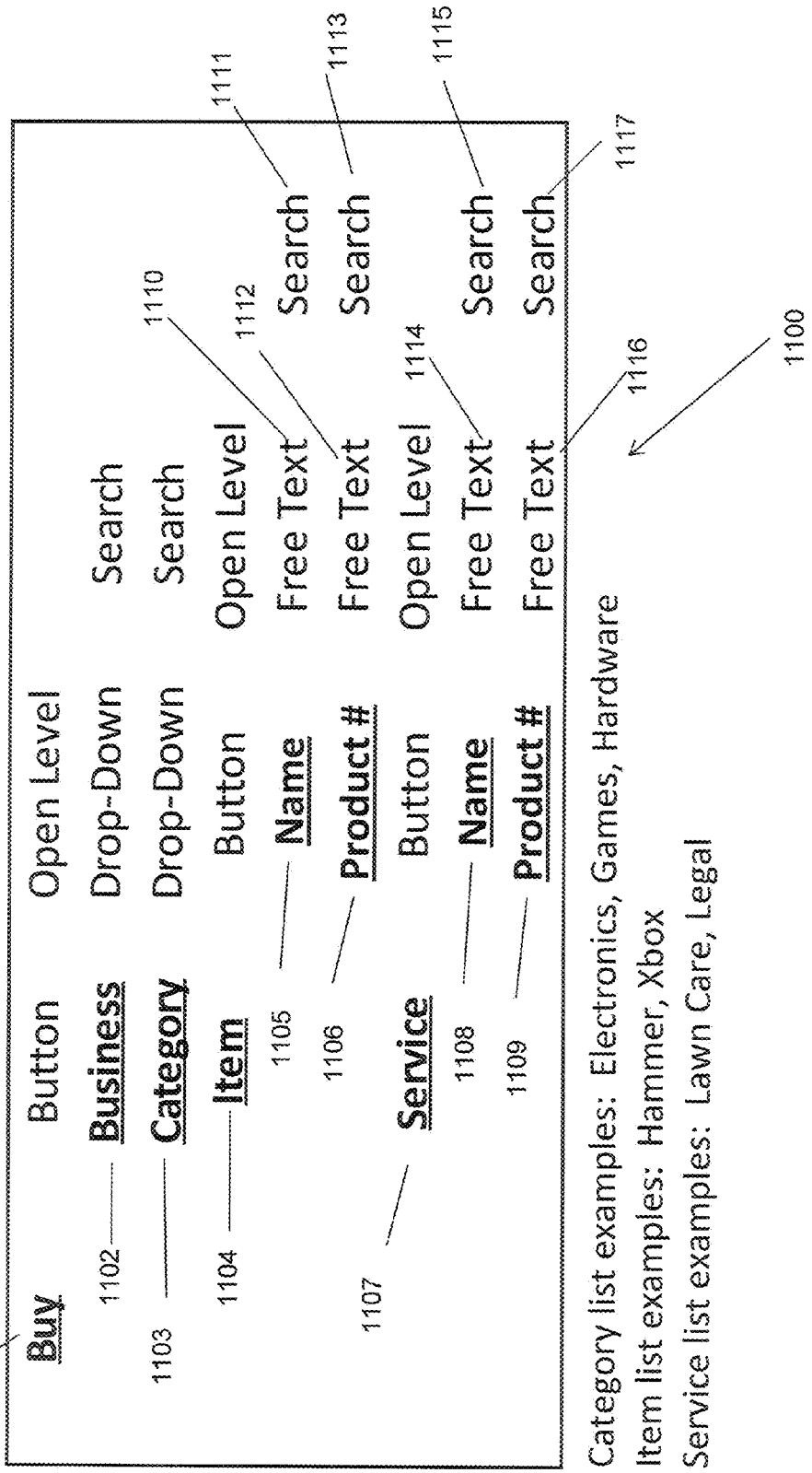
FIG. 6b is a diagram that illustrates various selectable buttons associated with a buy search service, according to an embodiment.
Figure 6C:
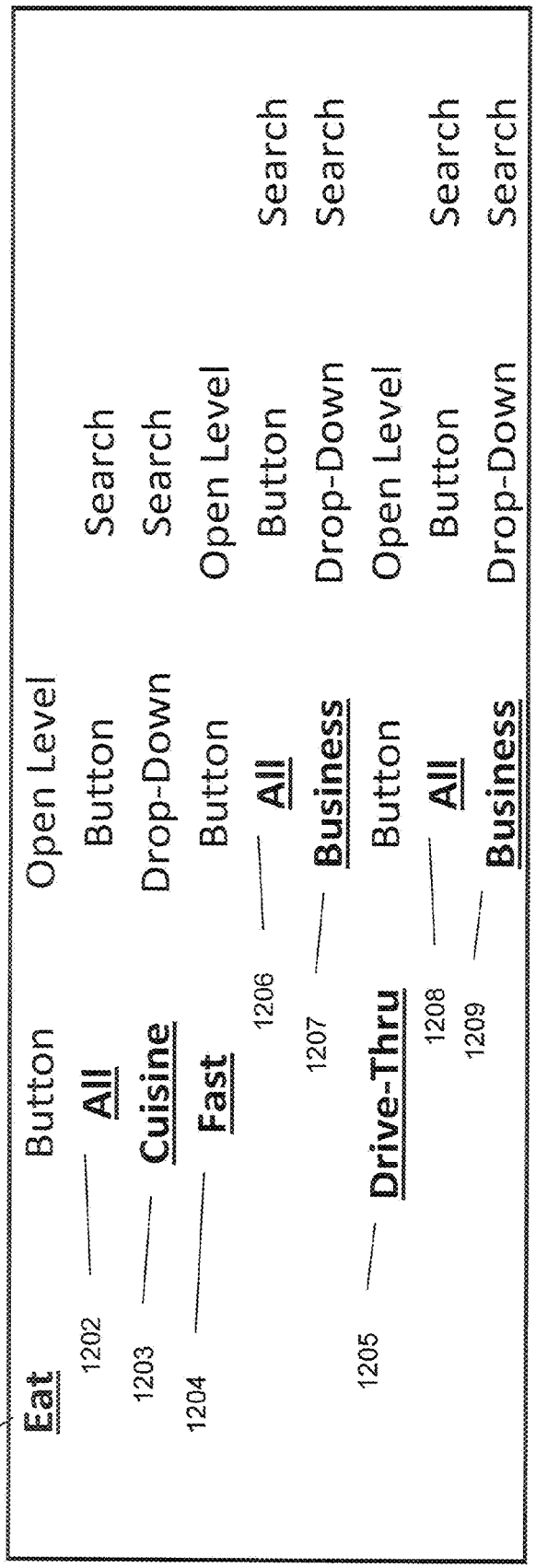
FIG. 6c is a diagram that illustrates various selectable buttons associated with an eat search service, according to an embodiment.

FIG. 3 shows a flow 700 associated with an embodiment of a products and services search and data return process. When either a mobile user 109 (see FIG. 1*d*) or a home and/or business users 104 (see FIG. 1*d*) opens their browser's web page at this method's aggregated location-based web pages delivery 309 (see FIG. 1*c*) on their computing device (e.g., mobile device, computer) at 701, the user can submit their location address details at 708 where the web pages delivery server 309 passes the information to the location, search, return data and alerts server 311 (see FIG. 1*c*), which performs the search and data return process as depicted in flow 700 and 800 (see FIG. 4). The location, search, return data and alerts server 311 can then communicate with the location, address verification, directions, and map transmission 315 (see FIG. 1*c*) providers to validate the submitted address at 709. FIGS. 5-7 below describe various aspects associated with a web page for aggregated location-based services that can be used at 701. For example, FIG. 5 shows a home web screen layout 900 for providing aggregated location-based services having main first level search buttons that include "Bank", "Buy", "Eat", and "Mail" buttons. FIGS. 6*a*-6*d* show tables describing several menu buttons that can be selected for a bank search 1000, a buy search 1100, an eat (or dine) search 1200, and a mail search 1300. FIG. 7 illustrates several variations of a count-down clock that can be used with search results associated with the above-described searches.

Returning to 709, an invalid address not recognized by a location, address verification, directions and map transmission 315 provider at 709 can return a notification to the browser of the services user 202 of the invalid address and a re-entry request of the address at 710. A valid address can allow the services user 202 to proceed and submit their distance and sort criteria at 702. The services user 202 can start a search by selecting a button from the service's web page 900 for aggregated location-based services at 703 which is delivered by the web pages delivery server 309. The process can check whether the search included a free text entry at 704. When free text is included in the search at 704, then the process checks for a match from the data store 211 at 711. When there is not a match in the data store 211 at 711, the browser of the service user 202 can be notified of the negative free text match and can prompt the user to perform a new search at 712 and the process can return to the services user 202 to enter a new search at 703.

When there is a match in the data store 211 of the free text entry at 711, then the aggregated location-based services can determine whether this is an item query search or a location search at 713. When the query search is for an item product, then the process can proceed to junction 714 which is described in more detail in the item query search process 800 (see FIG. 4). When the query search is a location search, then the location, search, return data and alerts server 311 queries the data store 211 to identify locations at 705. Locations and count-down times, for example, can be determined by the process at 706 and then the process can return the locations and count-down times to the browser of the service user 202 at 707.

Figure 4:
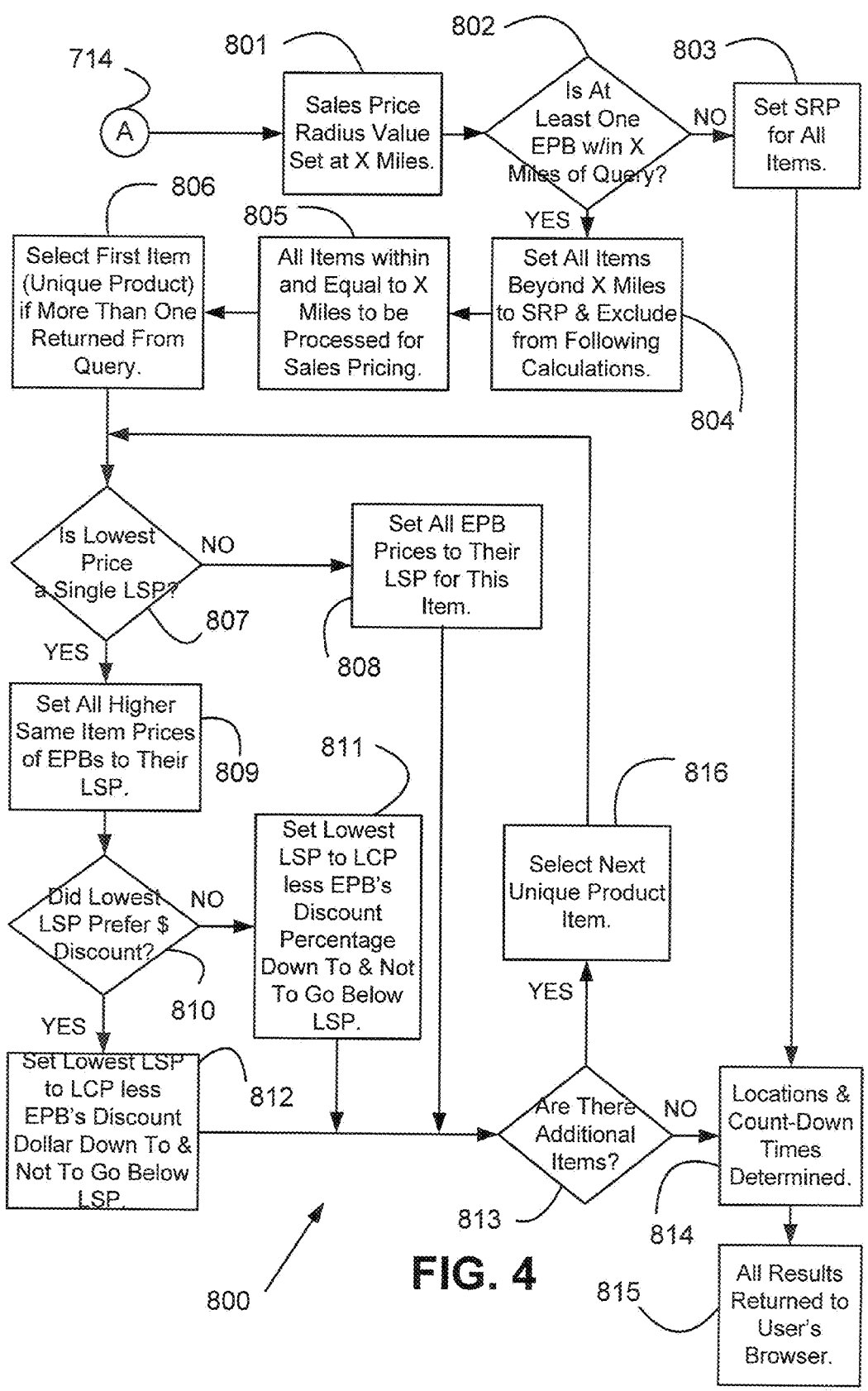
FIG. 4 is a flow diagram that illustrates a competitive sales pricing algorithm process, according to an embodiment.

FIG. 4 shows a flow 800 associated with an embodiment of a process for an item search and a competitive sales pricing algorithm that can be used with the flow 700 (see FIG. 3) described above where both process flows reside on the location, search, return data and alerts server 311. In the flow 800, EPB can refer to e-commerce participating business, LSP can refer to a lowest sales price, SRP can refer to a standard retail price, and LCP can refer to a lowest competitor price. The flow 700 at 714 (see FIG. 3) flows to 714 in process flow 800 such that during an item query, the process associated with flow 800 first inserts a distance radius value which is based upon changing business needs and requests from various e-commerce participating businesses 305 (see FIG. 1*c*), which can be based on, for example, a simple average of the requested value of the e-commerce participating businesses 305, a value determined by this process, a random value, or a standard value, such as 20 statute miles. This value can then be inserted into the process at 801 to establish a radius area from the location provided for the services users 202. The process can then check whether there is at least one e-commerce participating business 305 within this radius area at 802. When there are no e-commerce participating businesses 305 within this radius area, then the standard retail prices can be set for all items at 803. Locations and count-down times are then determined at 814 prior to returning final query search results to the browser of the services user 202 via the web pages delivery server 309 at 815. When the results at 802 include those of any e-commerce participating business 305 within the sales price radius area, then the items returned outside of this area can be set to their standard retail prices at 804 and can be excluded from further calculations and held to be later submitted with the calculated results when all of their locations and count-down times are calculated at 814.

The items within the sales process radius area and those equal to the exact distance of the radius area can then be selected for further processing at 805. When a search result included more than one distinct product, such as when the query search is for a "camera", for example, and multiple manufacturers and models are returned, then the process can identify the list of unique product items at 806 and provide the first item to further the process at 807. The first unique item can then be checked to determine whether the lowest price among the business locations that show this item to be in stock is a single lowest sales price. A lowest sales price may not be less than the price that an e-commerce participating business 305 may have approved to sell their product online and can be included with their inventory data updates in addition to their standard (e.g., in-store) retail price. When the lowest price in this first group of unique product items at 807 is that of a standard retail price—presumably from a non-participating business—or more than one lowest sales price, that is, there is a match, then all of the same unique items at any e-commerce participating business 305 in this query can be set to their lowest sales price at 808 to make the item more competitive.

The process can then check whether there are any additional product items that need to be calculated at 813. When the lowest price at 807 is determined to be the lowest sale prices of a single e-commerce participating business 305, then the higher priced e-commerce participating businesses 305 can be set to their lowest sales price at 809. The lowest sales priced e-commerce participating businesses 305 (see FIG. 1c) can then discount the price of their item by either a fixed dollar amount or a percentage from the next highest priced item in this group of items (e.g., a competitor's standard retail price or a competitor's lowest sales price that is now in effect). The resulting final price may not go below the lowest sales price of that e-commerce participating business 305 for that particular item. When the method chosen by the e-commerce participating business 305 is a dollar discount, then this calculation can be performed at 812, otherwise a percentage discount can be performed at 811. Either set of results can then proceed to determine whether any additional unique product items remain to be processed at 813. When additional unique product items remain to be processed, the process can increment to the next item at 816 and can submit that item to determine whether the lowest price is a single lowest sales price at 807. Once the competitive sales pricing algorithm has processed all of the returned items, then the locations and count-down times can be determined at 814 prior to returning final query search results to the browser of the services user 202 via the web pages delivery server 309 at 815.

FIG. 5 shows the home web screen layout 900 for providing aggregated location-based services having main first level search buttons that include "Bank", "Buy", "Eat", and "Mail" buttons as would be delivered by the web pages delivery server 309. Personality ads 901 can be displayed to surround a main logo 902 (e.g., UVerj) to provide random related graphics for ads, instructions, and/or sponsorships. Users can be provided with a log in button 903. Once logged in, a user can set personal preferences such as email and text alert addresses for service alerts from the aggregated location-based services and/or to enable the user's favorites button 911. A location button 904 can be used to enter the user's searched location address or to select the GPS location output provided by, for example, the user's mobile device. The sort button 905 can allow the user to set a sort order for the displayed data by either distance, price, or time, for example. The range button 912 can be used to set a radius distance from the user's location to include returned search results. When the user location is verified for either a physical address or a GPS output, then the user can press one of the search buttons, that is, the user can press or select one of "Bank" 906, "Buy" 908, "Eat" 909, or "Mail" 910. The search buttons allow for further search filtering options by displaying a second tier row of corresponding buttons below the first tier level of search buttons. Initially the first tier level of search buttons can be displayed in blue until one of the main four search buttons is pressed. Once pressed, the remaining still selectable first row search buttons turn red and the second row of blue relevant search buttons appear below. At any time any of the displayed buttons can be pressed to change the query string. Full search options are further detailed below with respect to FIGS. 6a-d. Corporate and copyright links 907 can be displayed to anchor the bottom of the web pages allowing interested vendors and businesses to contact a company providing aggregated location-based services to, for example, request a contractual business relationship.

FIG. 6a is a table that shows several menu buttons that can be selected for the bank search 1000. While the data structure, labels and functionality of the buttons can be stored in the data store 211, the rendering to the services users 202 can be performed by the web pages delivery server 309. Data base tables in the data store 211 can be organized such that each record for an item, service, or location identifies each record as either a Bank, Buy, Eat, or Mail category and then further in another data base field as one of their subsets such as ATM or Drop-off for rapid searches. The table is organized so that all entries associated with buttons are underlined and bolded, such as "Bank" button 1001 (also depicted as 906 in FIG. 5). To the right of each button is the description of the type of button, such as "Button" 1010 or "Drop-down" 1014. To the right of the type of button is the function of the button, such as "Open Level" 1011 or "Search" 1013. One of the first tier search buttons is the "Bank" button 1001. Pressing the "Bank" button 1001 opens a row of buttons below it (Open Level 1011) that displays buttons "All" 1002, "ATM" 1003, "Business" 1004, which may also be labeled "Biz", and "Drive-thru" 1005. When the "All" button 1002 is pressed, then the aggregated location-based services can return to the user's browser all bank and ATM locations within the radius distance from the user's selected location. When the "ATM" button 1003 is pressed, then the aggregated location-based services can open a row of buttons below it (Open Level 1016) which then displays buttons "All" 1006, and "Business" 1007, which may also be labeled "Biz". When the "All" button 1006 is pressed, then the aggregated location-based services can return to the user's browser all ATM locations within the radius distance from the user's selected location. When the "Business" button 1007 is pressed, then the aggregated location-based services can display a drop-down list of bank names to select to query only a single bank's ATMs within the radius distance from the user's selected location. Pressing the "Business" button 1004 in the second tier under the "Bank" button 1001 can also display a drop-down list of bank names to select a query for only a single bank's locations of all branches and ATMs within the radius distance from the user's selected location. Pressing the "Drive-thru" button 1005 can open a row of buttons below displaying the buttons "All" 1008 and "Business" 1009, which may also be labeled "Biz". Pressing the "All" button 1008 can display to the user all drive-thru bank locations within the user's search parameters. When the "Business" button 1009 is pressed, then the aggregated location-based services can display a drop-down list of bank names to select a query for only a single bank's drive-thru within the radius distance from the user's selected location.

FIG. 6b is a table that shows several menu buttons that can be selected for the buy search 1100. While the data structure, labels and functionality of the buttons can be stored in the data store 211, the rendering to the services users 202 can be performed by the web pages delivery server 309. Data base tables in the data store 211 can be organized such that each record for an item, service, or location identifies each record as either a Bank, Buy, Eat, or Mail category and then further in another data base field as one of their subsets such as ATM or Drop-off for rapid searches. The table follows the same rules of interpretation as the table described above with respect to FIG. 6a. The table is organized so that all entries associated with buttons are underlined and bolded, such as the "Buy" button 1101 (also depicted as 908 in FIG. 5). One of the first tier search buttons is the "Buy" button 1101. Pressing the "Buy" button 1101 can open a row of buttons below it that displays buttons "Business" 1102, which may also be labeled "Biz", "Category" 1103, "Item" 1104, and "Service" 1107. The buttons "Business" 1102 and "Category" 1103 both display a drop-down box to select pre-populated choices to then perform searches of locations by either a store name or category of a product, respectively. Pressing the "Item" button 1104 opens a third tier row below it consisting of two buttons, "Name" 1105 and "Product #" 1106. Pressing the "Name" button 1105 opens a text box for the user to enter free text 1110. When the user enters "camera" as the free text, for example, then the aggregated location-based services can perform a search 1111 of items having "camera" in the product name that can be found within the radius distance from the user's selected location. Pressing the "Product #" button 1106 can open a text box for the user to enter free text 1112, such as a Universal Product Code (UPC). When the user enters "PN123ABC", for example, then the aggregated location-based services can perform a search 1113 of items having "PN123ABC" in the product number that can be found within the radius distance from the user's selected location. The "Service" button 1107 allows users to open a third tier row of buttons "Name" 1108 and "Product #" 1109. Pressing the "Name" button 1108 opens a text box for the user to enter free text 1114. When the user enters "lawn service", for example, then the aggregated location-based services performs a search 1115 for businesses that have lawn service in their service offerings that can be found within the radius distance from the user's selected location. Pressing the "Product #" button 1109 opens a text box for the user to enter free text 1116 (such as a UPC). When the user enters "PN123ABC", for example, then the aggregated location-based services can perform a search 1117 of services which have "PN123ABC" in the service's product number that can be found within the radius distance from the user's selected location.

FIG. 6c is a table that shows several menu buttons that can be selected for the eat or dining search 1200. While the data structure, labels and functionality of the buttons can be stored in the data store 211, the rendering to the services users 202 can be performed by the web pages delivery server 309. Data base tables in the data store 211 can be organized such that each record for an item, service, or location identifies each record as either a Bank, Buy, Eat, or Mail category and then further in another data base field as one of their subsets such as Cuisine or Drive-thru for rapid searches. The table follows the same rules of interpretation as the table described above with respect to FIG. 6a. The table is organized so that all entries associated with buttons are underlined and bolded, such as "Eat" 1201 (also depicted as 909 in FIG. 5). The second tier row of buttons consist of "All" 1202, "Cuisine" 1203, "Fast" 1204, and "Drive-thru" 1205. By pressing the "All" button 1202, a wide range of restaurants within the radius distance from the user's selected location can be displayed. Pressing the "Cuisine" button 1203 displays a drop-down box to select from multiple cuisine options to display restaurants which serve the particular type of cuisine selected within the radius distance from the user's selected location. Pressing the "Fast" button 1204 opens the third tier row of buttons "All" 1206 and "Business" 1207, which may also be labeled "Biz". Pressing the "All" button 1206 searches and displays all fast food restaurants within the radius distance from the user's selected location. Pressing the "Business" button 1207 displays a drop-down box to select a fast food business option to display the selected restaurant or chain within the radius distance from the user's selected location. Pressing the "Drive-thru" button 1205 opens its third tier row of buttons "All" 1208 and "Business" 1209, which may also be labeled "Biz". Pressing the "All" button 1208 searches and displays all drive-thru restaurants within the radius distance from the user's selected location. Pressing the "Business" button 1209 displays a drop-down box to select a drive-thru business option to display the selected restaurant or chain within the radius distance from the user's selected location.

FIG. 6d is a table that shows several menu buttons that can be selected for a mail search 1300. While the data structure, labels and functionality of the buttons can be stored in the data store 211, the rendering to the services users 202 can be performed by the web pages delivery server 309. Data base tables in the data store 211 can be organized such that each record for an item, service, or location identifies each record as either a Bank, Buy, Eat, or Mail category and then further in another data base field as one of their subsets such as ALL or Drop-off for rapid searches. The table follows the same rules of interpretation as the table described above with respect to FIG. 6a. The table is organized so that all entries associated with buttons are underlined and bolded, such as "Mail" 1301 (also depicted as 910 in FIG. 5). The second tier row of buttons consist of "All" 1302, "Drop-off" 1303, "Services" 1306, and "Supplies" 1309. Pressing the "All" button 1302 displays mail facilities and mail drop-off locations within the radius distance from the user's selected location. Pressing the "Drop-off" button 1303 opens its third tier row of buttons "All" 1304 and "Business" 1305, which may also be labeled "Biz". Pressing the "All" button 1304 searches and displays all mail drop-off locations within the radius distance from the user's selected location. Pressing the "Business" button 1305 displays a drop-down box to select a drop-off location business option to display the selected mail drop-off locations for the selected business within the radius distance from the user's selected location. Pressing the "Services" button 1306 opens its third tier row of buttons "All" 1307 and "Business" 1308, which may also be labeled "Biz". Pressing the "All" button 1307 searches and displays all mail services locations within the radius distance from the user's selected location. Pressing the "Business" button 1308 displays a drop-down box to select a mail services location business option to display the selected mail services locations for the selected business within the radius distance from the user's selected location. Pressing the "Supplies" button 1309 opens its third tier row of buttons "All" 1310 and "Business" 1311 (may be referred to as "Biz"). Pressing the "All" button 1310 searches and displays all mail supply locations within the radius distance from the user's selected location. Pressing the "Business" button 1311 (may be referred to as "Biz") displays a drop-down box to select a mail supply location business option to display the selected mail supply locations for the selected business within the radius distance from the user's selected location.

FIG. 7 illustrates several variations of a count-down clock that can be used with search results associated with the searches described above. While location business hours of operation and pick-up times can be stored in the data store 211 and can be calculated by the location, search, return data and server alerts 311 with the flows 700 and 800 (see FIGS. 3 and 4), such times can also be adjusted for local time zones so that actual count-down times can be determined anywhere in the world. Searches made through the "Bank" button 906 (also 1001), the "Buy" button 908 (also 1101), or the "Eat" button 909 (also 1201) can display a count-down clock associated with the hours of operation of an establishment resulting from such searches. For example, the count-down clock can indicate a time remaining before a bank, or a store, or a restaurant closes or a time before a bank, or a store, or a restaurant is to open. Three such count-down clocks are shown, including "closes in" 1401, "closes in" 1402, or "opens in" 1403. The "closes in" 1401 count-down clock can be displayed in a color, such as green, to visually indicate that an amount of time that remains before the establishment is to close is more than a predetermined amount of time. The "closes in" 1402 count-down clock can be displayed in a different color, such as amber or yellow, to indicate that an amount of time that remains before the establishment is to close is less than a predetermined amount of time. The "opens in" 1403 count-down clock can be displayed in yet another color, such as red, to indicate that the establishment is closed and the amount of time displayed is the time remaining until opening.

Searches originating from the "Mail" button 910 (also 1301) can result in substantially similar count-down clock displays, however, a mail button search can be followed by a "Drop-off" button 1303 search. Mail drop-off button searches will can display a "pickup in" 1404 count-down clock with, for example, a green-colored background, a "pickup in" 1405 count-down clock with, for example, an amber-colored or yellow-colored background, or a "pickup in" 1406 count-down clock with, for example, a red-colored background. The "closes in" 1401 and 1402 count-down clocks can display the time in hours and minutes until the particular location closes. The "opens in" 1403 count-down clock can display the time in hours and minutes until the particular location opens. The "pickup in" 1404, 1405, and 1406 count-down clocks can display the time in hours and minutes until the next pick up. Green-colored backgrounds can be used when the time displayed is, for example, more than 60 minutes. Amber- or yellow-colored backgrounds can be used when the time displayed is, for example, less than 60 minutes. Red-colored backgrounds can be used to indicate a closed store or that a last pick up has occurred for the day. When the "Mail" button 910 (also 1301) is followed by the "Drop-off button" 1303 search, the time displayed can be in reference to the daily last mail pickup at each location.

The above-described home web screen layout and menu buttons are provided by way of example, and the present disclosure need not be so limited.

What is claimed is:

1. A method, comprising:
receiving on at least one computer information associated with a selection made by a user from among a plurality of search options concurrently displayed to the user through a web browser;
receiving on the at least one computer information associated with a geographical location of the user, such information being produced by a device on which the web browser is displayed or provided by the user through the web browser;
receiving on the at least one computer information associated with a geographical range of interest of the user;
processing on the at least one computer the information associated with the selection made, the geographical location, and the geographical range of interest to determine a plurality of businesses of interest, the plurality of businesses of interest including a one or more participating businesses and one or more non-participating businesses;
determining on the at least one computer a price associated with each of the plurality of businesses of interest;
when a business from the plurality of businesses of interest is a participating business and the price associated with the participating business is not a lowest price of the prices associated with the plurality of businesses of interest, automatically adjusting the price associated with the participating business;
when a business from the plurality of businesses of interest is a non-participating business and the price associated with the non-participating business is not a lowest price of the prices associated with the plurality of businesses of interest, automatically deciding to not adjust the price associated with the non-participating business; and
sending the price associated with each of the plurality of businesses of interest to the web browser for display;
wherein a record associated with the participating business stored on the at least one computer is updatable by at least one participating business computer in communication with the at least one computer.

2. The method of claim 1, wherein:
the price associated with each of the plurality of businesses of interest is the price of a service, or a item, or both, provided by the plurality of businesses of interest, and
the service, or the item, or both, for which the price is determined, is based on the information associated with the selection made by a user through the web browser.

3. The method of claim 1, further comprising:
determining the lowest price of the prices associated with the plurality of businesses of interest; and
adjusting the price associated with at least one of the one or more participating businesses to be the lowest price when the lowest price is higher than a minimum price provided by the at least one of the one or more participating businesses.

4. The method of claim 3, further comprising:
adjusting the price associated with the at least one of the one or more participating businesses based on a predetermined percentage of a standard retail price or on a predetermined amount below the standard retail price to produce an adjusted price,
wherein when the adjusted price is lower than a minimum price provided by the at least one of the one or more participating businesses, the adjusted price is set to the minimum price.

5. The method of claim 1, wherein:
when a business from the plurality of businesses of interest is a non-participating business, the price associated with the non-participating business is based on data collected from a web site associated with the non-participating business.

6. The method of claim 1, wherein:
the price associated with the participating business is based on data received from the participating business, the data including a standard retail price, or discount pricing information, or both.

7. The method of claim 1, wherein:
a business is deemed to be a business of interest when that business has an available service or an available item associated with the selection made by the user, the availability of the service or the availability of the item being determined based on data stored and associated with that business.

8. The method of claim 1, wherein the processing to determine the plurality of businesses of interest comprises:

identifying the geographical location of the one or more participating businesses and the one or more non-participating businesses;

determining whether the geographical location of the one or more participating businesses and the one or more non-participating businesses is within the geographical range of interest;

designating the one or more participating businesses and the one or more non-participating businesses as the plurality of one or more businesses of interest when the geographical location of the one or more participating businesses and the one or more non-participating businesses is within the geographical range of interest; and not designating the one or more participating businesses and the one or more non-participating businesses as the plurality of businesses of interest when the geographical location of the one or more participating businesses and the one or more non-participating businesses is not within the geographical range of interest.

9. The method of claim 1, wherein the plurality of search options concurrently displayed to the user through the web browser comprises a plurality of selectable search categories.

10. The method of claim 9, wherein the plurality of search options concurrently displayed to the user through the web browser further comprises a plurality of selectable search sub-categories displayed to the user through the web browser in response to a selection of at least one of the plurality of selectable search categories.

11. The method of claim 9, wherein the plurality of search options further comprises a text entry interface displayed to the user through the web browser in response to a selection of at least one of the plurality of selectable search categories and configured to enable text searches within the selected at least one of the plurality of selectable search categories.

12. A system, comprising:
at least one server configured to execute an application to communicate with one or more web sites to collect data from the web sites; and
a storage device configured to store data, including the data collected from the web sites,
wherein the at least one server is configured to search the data stored in the storage device based on information received associated with a selection made by a user from among a plurality of search options concurrently displayed to the user through a web browser, on a geographical location of the user, and on a geographical range of interest of the user, the at least one server being configured to determine a plurality of businesses of interest based on the searched data, the plurality of businesses of interest including one or more participating businesses and one or more non-participating businesses, the at least one server being configured to determine a price associated with each of the plurality of businesses of interest, the at least one server being configured to automatically adjust the price associated with the participating business when a business from the plurality of businesses of interest is a participating business and the price associated with the participating business is not a lowest price of the prices associated with the plurality of businesses of interest, the at least one server being configured to automatically decide not to adjust the price associated with the non-participating business when a business from the plurality of businesses of interest is a non-participating business and the price associated with the non-participating business is not a lowest price of the prices associated with the plurality of businesses of interest, wherein the at least one server is configured to send the price associated with each of the plurality of businesses of interest to the web browser for display, and wherein a record associated with the participating business stored on the storage device is updatable by at least one participating business computer in communication with the at least one server.

13. The system of claim 12, wherein:
the price associated with each of the plurality of businesses of interest is the price of a service, or a item, or both, provided by the plurality of businesses of interest, and
the service, or the item, or both, for which the price is determined, is based on the information associated with the selection made by a user through the web browser.

14. The system of claim 12, wherein:
the at least one server is configured to determine a lowest price from the prices associated with the plurality of businesses of interest, and
the at least one server is configured to adjust the price associated with the at least one of the one or more participating businesses to be the lowest price when the lowest price is above a minimum price provided by the at least one of the one or more participating businesses.

15. The system of claim 14, wherein:
the at least one server is configured to adjust the price associated with the at least one of the one or more participating businesses based on a predetermined percentage of a standard retail price or on a predetermined amount below the standard retail price to produce an adjusted price,
wherein when the adjusted price is lower than a minimum price provided by the at least one of the one or more participating businesses, the adjusted price is set to the minimum price.

16. The system of claim 12, wherein:
when a business from the plurality of businesses of interest is a non-participating business, the price associated with the non-participating business is based on data collected by the first server from a web site associated with the non-participating business.

17. The system of claim 12, wherein:
the price associated with the participating business is based on data stored in the storage device and received from the participating business, the data including a standard retail price, or discount pricing information, or both.

18. The system of claim 12, wherein:
the at least one server is configured to execute the application to communicate with the one or more web sites to collect data from the web sites according to a predetermined schedule.

19. The system of claim 12, wherein:
the data collected from the web sites includes store location and address, or a location name, or a location type, or a phone number, or hours of operation, or mail pick-up times, or package pick-up times, or an item price, or a service price, or inventory quantities, or a product name, or a product number, or a combination thereof.

20. The system of claim 12, wherein:
the at least one server is configured to authenticate a communication with a participating business to store data associated with that participating business in the storage device, and
the data associated with that participating business includes store location and address, or a location name, or a location type, or a phone number, or hours of operation, or mail pick-up times, or package pick-up times, or an item price, or a service price, or inventory quantities, or a product name, or a product number, or a universal product code (UPC), or a combination thereof.

21. The system of claim 12, wherein determining the plurality of businesses of interest comprises:
identifying the geographical location of the one or more participating businesses and the one or more non-participating businesses;
determining whether the geographical location of the one or more participating businesses and the one or more non-participating businesses is within the geographical range of interest;
designating the one or more participating businesses and the one or more non-participating businesses as the plurality of businesses of interest when the geographical location of the one or more participating businesses and the one or more non-participating businesses is within the geographical range of interest; and
not designating the one or more participating businesses and the one or more non-participating businesses as the plurality of businesses of interest when the geographical location of the one or more participating businesses and the one or more non-participating businesses is not within the geographical range of interest.

22. The system of claim 12, wherein the plurality of search options concurrently displayed to the user through the web browser comprises a plurality of selectable search categories.

23. The system of claim 22, wherein the plurality of search options concurrently displayed to the user through the web browser further comprises a plurality of selectable search sub-categories displayed to the user through the web browser in response to a selection of at least one of the plurality of selectable search categories.

24. The system of claim 22, wherein the plurality of search options further comprises a text entry interface displayed to the user through the web browser in response to a selection of at least one of the plurality of selectable search categories and configured to enable text searches within the selected at least one of the plurality of selectable search categories.

25. A method, comprising:
receiving on at least one computer information associated with a selection made by a user from among a plurality of search options concurrently displayed to the user through a web browser;
receiving on the at least one computer information associated with a geographical location of the user, such information being produced by a device on which the web browser is displayed or provided by the user through the web browser;
receiving on the at least one computer information associated with a geographical range of interest of the user;
processing on the at least one computer the information associated with the selection made, the geographical location, and the geographical range of interest to determine one or more businesses of interest;
generating a timing information associated with a time remaining before a closing time of a business from the one of more businesses of interest, or with a time remaining before an opening time of that business, or with a time remaining before a pick up time at that business, the timing information comprising a numeric time value having associated a color;
updating the timing information comprising the numeric time value periodically;
sending the timing information comprising the numeric time value to the web browser for display; and
periodically sending an updated timing information comprising the numeric time value to the web browser for display.

26. The method of claim 25, wherein:
when the time remaining before the closing time or before the pick up time is more than a predetermined time, the color associated with the timing information is green.

27. The method of claim 25, wherein:
when the time remaining before the closing time or before the pick up time is less than a predetermined time, the color associated with the timing information is amber or yellow.

28. The method of claim 25, wherein:
the color associated with the time remaining before the opening time, or when the next pick-up time is not the same day, is red.

29. The method of claim 25, further comprising:
sending the price associated with each of the one or more businesses of interest to the web browser for display;
receiving a selection of one of the one or more businesses of interest; and
generating the timing information for the selected business from the one or more businesses of interest.

30. The method of claim 25, wherein the plurality of search options concurrently displayed to the user through the web browser comprises a plurality of selectable search categories.

31. The method of claim 30, wherein the plurality of search options concurrently displayed to the user through the web browser further comprises a plurality of selectable search sub-categories displayed to the user through the web browser in response to a selection of at least one of the plurality of selectable search categories.

32. The method of claim 30, wherein the plurality of search options further comprises a text entry interface displayed to the user through the web browser in response to a selection of at least one of the plurality of selectable search categories and configured to enable text searches within the selected at least one of the plurality of selectable search categories.

* * * * *